United States Patent
Wu

(10) Patent No.: US 8,422,006 B2
(45) Date of Patent: Apr. 16, 2013

(54) SYSTEM AND METHOD FOR TESTING LENS MODULE

(75) Inventor: Cheng-Shiun Wu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 307 days.

(21) Appl. No.: 12/969,477

(22) Filed: Dec. 15, 2010

(65) Prior Publication Data
US 2012/0105833 A1    May 3, 2012

(30) Foreign Application Priority Data
Oct. 28, 2010   (TW) ................................ 99137063 A

(51) Int. Cl.
*G01B 11/26* (2006.01)
(52) U.S. Cl.
USPC .......... 356/135; 359/819; 359/825; 269/303; 414/755
(58) Field of Classification Search .................. 356/138; 359/819, 825
See application file for complete search history.

(56) References Cited

U.S. PATENT DOCUMENTS

| | | | | |
|---|---|---|---|---|
| 5,768,035 A | * | 6/1998 | Grassens et al. | 359/822 |
| 6,023,379 A | * | 2/2000 | Grassens et al. | 359/819 |
| 7,375,908 B2 | * | 5/2008 | Takahashi | 359/819 |
| 7,433,137 B2 | * | 10/2008 | Irisawa | 359/819 |

* cited by examiner

*Primary Examiner* — Tarifur Chowdhury
*Assistant Examiner* — Isiaka Akanbi
(74) *Attorney, Agent, or Firm* — Altis Law Group, Inc.

(57) ABSTRACT

A system for testing a lens module is provided. The lens module includes a barrel and a lens received in the barrel. The barrel includes a side surface which is parallel to the central axis thereof. The lens includes a smooth flat non-optical surface. The system includes an alignment device, a position detection device, and a processing device. The alignment device includes a leveling unit and an alignment block including an alignment surface for being in contact with and parallel to the side surface. The leveling unit adjusts the alignment surface to be perpendicular to a horizontal plane such that the side surface is perpendicular to the horizontal plane. The position detection device determines the three dimensional coordinates of three non-collinear points on the non-optical surface. The processing device determines whether the non-optical surface is parallel to the horizontal plane according to the coordinates of the three non-collinear points.

10 Claims, 5 Drawing Sheets

SYSTEM AND METHOD FOR TESTING LENS MODULE

BACKGROUND

1. Technical Field

The present disclosure relates to a system and a method for checking assembly parameters of a lens module.

2. Description of Related Art

Lens modules are widely used in consumer electronic products for photo shooting. The lens module includes a barrel and a lens received in the barrel. For getting good images, an optical axis of the lens must be parallel to a central axis of the barrel.

Thus, what is needed is a system and a method for checking whether the optical axis of the lens is parallel to the central axis of the barrel after the lens is mounted in the barrel.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
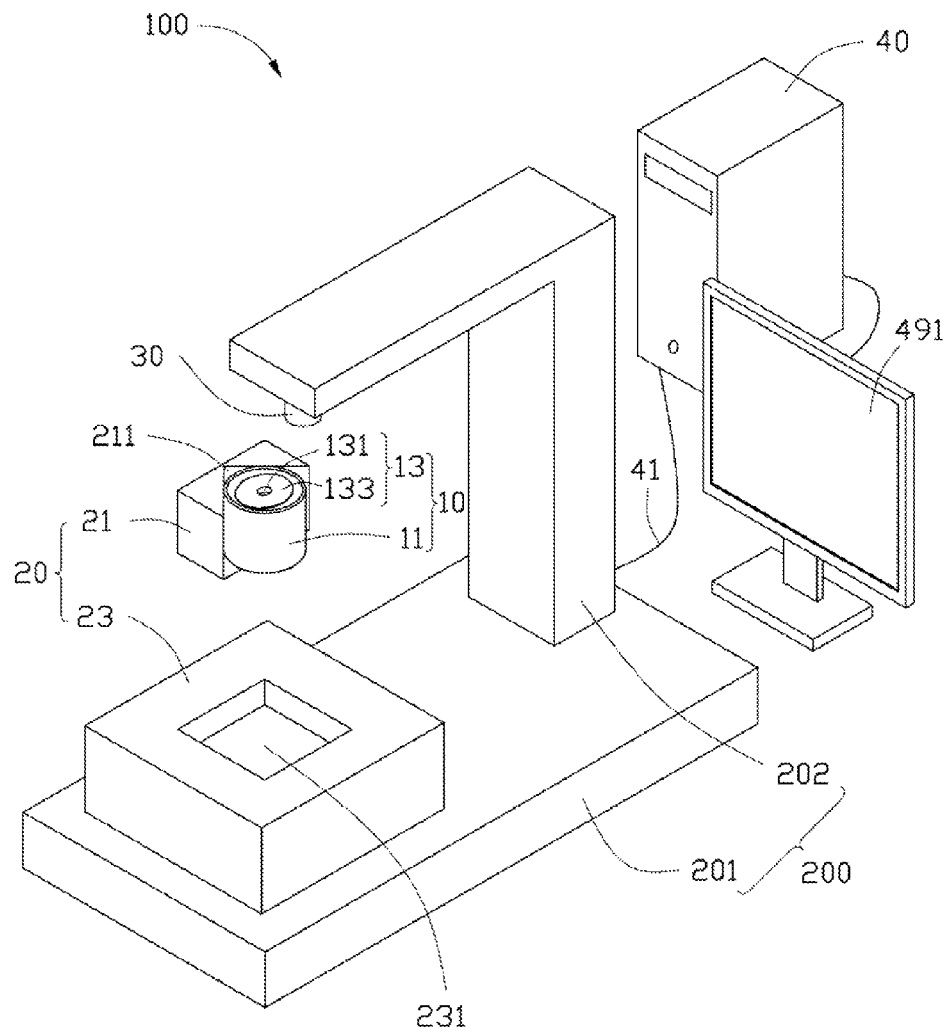
FIG. 1 is a schematic, isometric view of a system for testing a lens module according to one embodiment.
Figure 2:
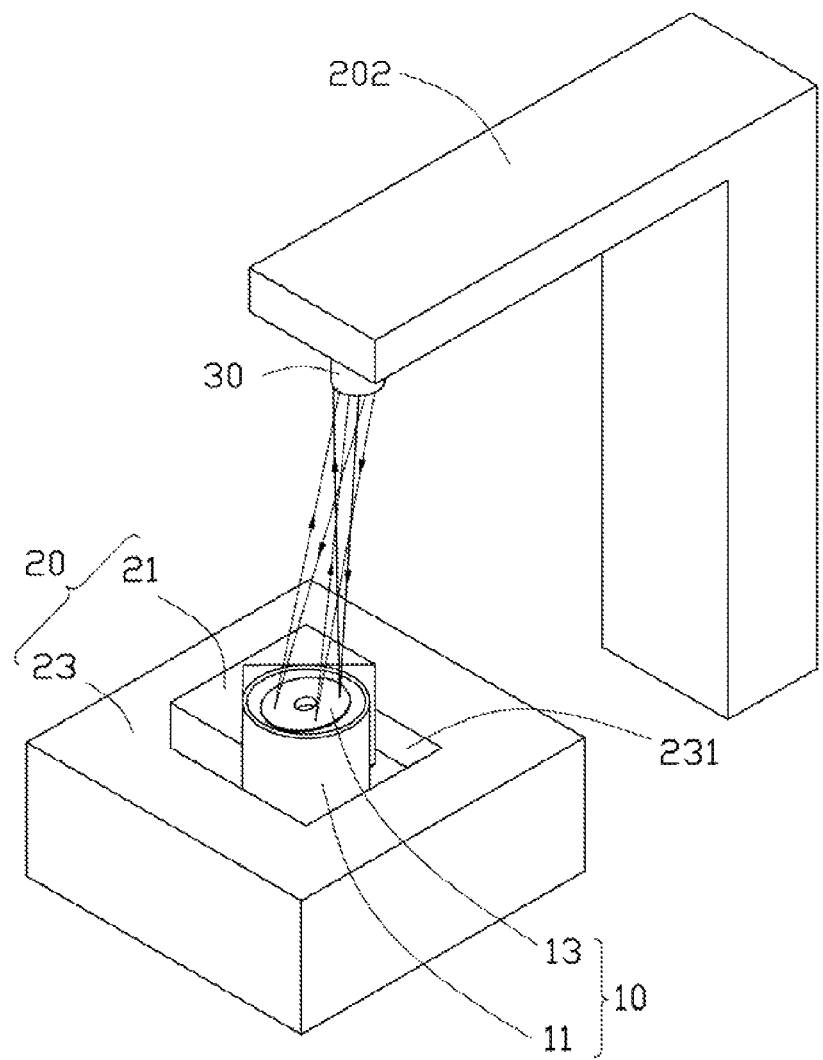
FIG. 2 is a partial, enlarged view of the system of FIG. 1 in a working state.

Referring to FIGS. 1 and 2, one embodiment of a system 100 includes a frame 200, an alignment device 20, a position detection device 30, and a processing device 40. The system 100 is used to check a lens module 10.

The lens module 10 includes a barrel 11 and a lens 13 received in the barrel 11. A central axis of the barrel 11 is parallel to a side surface of the barrel 11. The lens 13 includes an optical surface 131 and a non-optical surface 133 surrounding the optical surface 131. The non-optical surface 133 is a smooth flat surface. An optical axis of the lens 13 is perpendicular to the non-optical surface 133. If the lens 13 is correctly mounted in the barrel 11, the non-optical surface 133 is perpendicular to the central axis of the barrel 11.

The frame 200 includes a horizontal support 201 and an L shaped arm 202 mounted on the horizontal support 201.

The alignment device 20 is mounted on the horizontal support 201. The alignment device 20 includes a leveling unit 23 and an alignment block 21. The leveling unit 23 defines a receiving space 231 for receiving the lens module 10 and the alignment block 21. In this embodiment, the receiving space 231 is cube-shaped. The alignment block 21 is cube-shaped and defines a V-shaped groove 211. When the alignment block 21 and the lens module 10 are received in the receiving space 231, portions of the side surface of the barrel 11 are in contact with side surfaces of the V-shaped groove 211, and the side surfaces of the V-shaped groove 211 are perpendicular to the bottom surface of the receiving space 231. The leveling unit 23 is adjusted to make the side surfaces of the V-shaped groove 211 perpendicular to a horizontal plane. In this way, the side surface of the barrel 11 and the central axis of the barrel 11 are held perpendicular to the horizontal plane.

The detection device 30 is an optical-based detection device fixed on the L shaped arm 202 and faces the lens 13 fixed in the barrel 11. The detection device 30 is used to determine the orientation of the non-optical surface 133 of the lens 13 in three dimensions (3D). In this embodiment, the detection device 30 determines coordinates of three non-collinear points O1, O2, O3 of the non-optical surface 133, wherein the coordinates are determined in relation to a spatially fixed coordinate system using the axes X, Y and Z, and the plane XOY is the horizontal plane. The detection device 30 and the corresponding method are familiar to persons skilled in the art, thus, a detailed description is omitted here.

Figure 3:
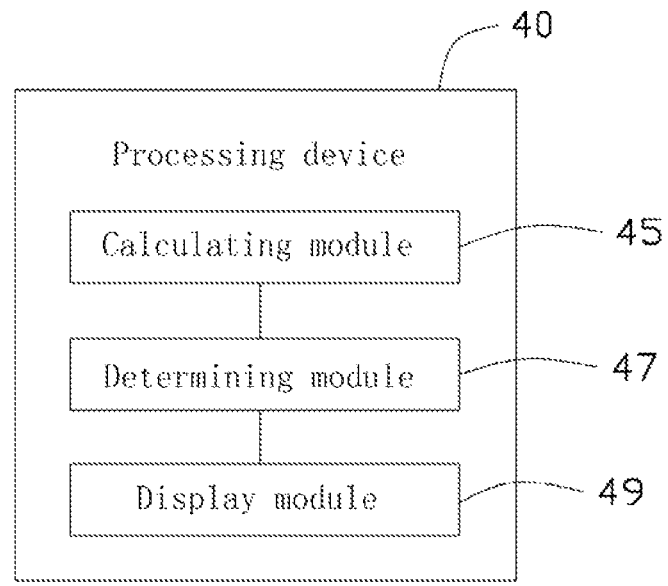
FIG. 3 is a block diagram of a processing device of the system of FIG. 1.
Figure 4:
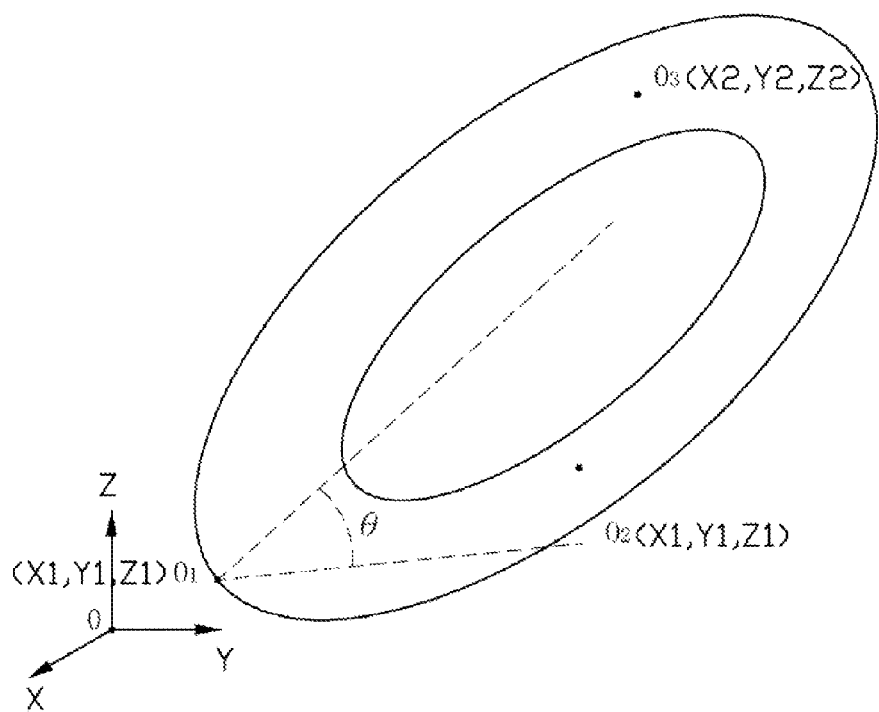
FIG. 4 is a schematic view showing how to calculate an angle between a lens and a horizontal plane.

The detection device 30 sends the detected coordinates to the processing device 40 via a data line 41. The processing device 40 determines whether the non-optical surface 133 is perpendicular to the central axis of the barrel 11 according to the coordinates. Referring to FIGS. 3 and 4, the processing device 40 includes a calculating module 45, a determining module 47, and a display module 49.

The calculating module 45 calculates the angle θ between the non-optical surface 133 and the horizontal plane according to the following formula:

$$\theta = \arccos\left(\frac{\begin{vmatrix} 1 & 1 & 1 \\ (x2-x1) & (y2-y1) & (z2-z1) \\ (x3-x1) & (y3-y1) & (z3-z1) \end{vmatrix}}{\begin{vmatrix} (x2-x1) & (y2-y1) \\ (x3-x1) & (y3-y1) \end{vmatrix}}\right),$$

wherein (x1, y1, z1) are the coordinates of the point O1, (x2, y2, z2) are the coordinates of the point O2, and (x3, y3, z3) are the coordinates of the point O3.

The determining module 47 determines whether the lens module 10 is qualified, that is, whether the lens 13 is correctly mounted in the barrel 11, and sends the result to the display module 49. The display module 49 shows the result on a display panel 491. In this embodiment, if the lens 13 is correctly mounted in the barrel 11, the non-optical surface 133 will be parallel to the horizontal plane, and the angle θ will be substantially equal to 0° or 180°. Yet, the angle θ may not be exactly equal to 0° or 180° because of acceptable assembly error or detection error. An acceptable angle range of (0°, 5°) and (175°, 180°) may be preset in the determining module 47. The determining module 47 compares the angle θ with the acceptable angle range. If the angle θ is in the acceptable angle range, the determining module 47 determines the lens module 10 is qualified, otherwise the determining module 47 determines the lens module 10 is unqualified.

Figure 5:
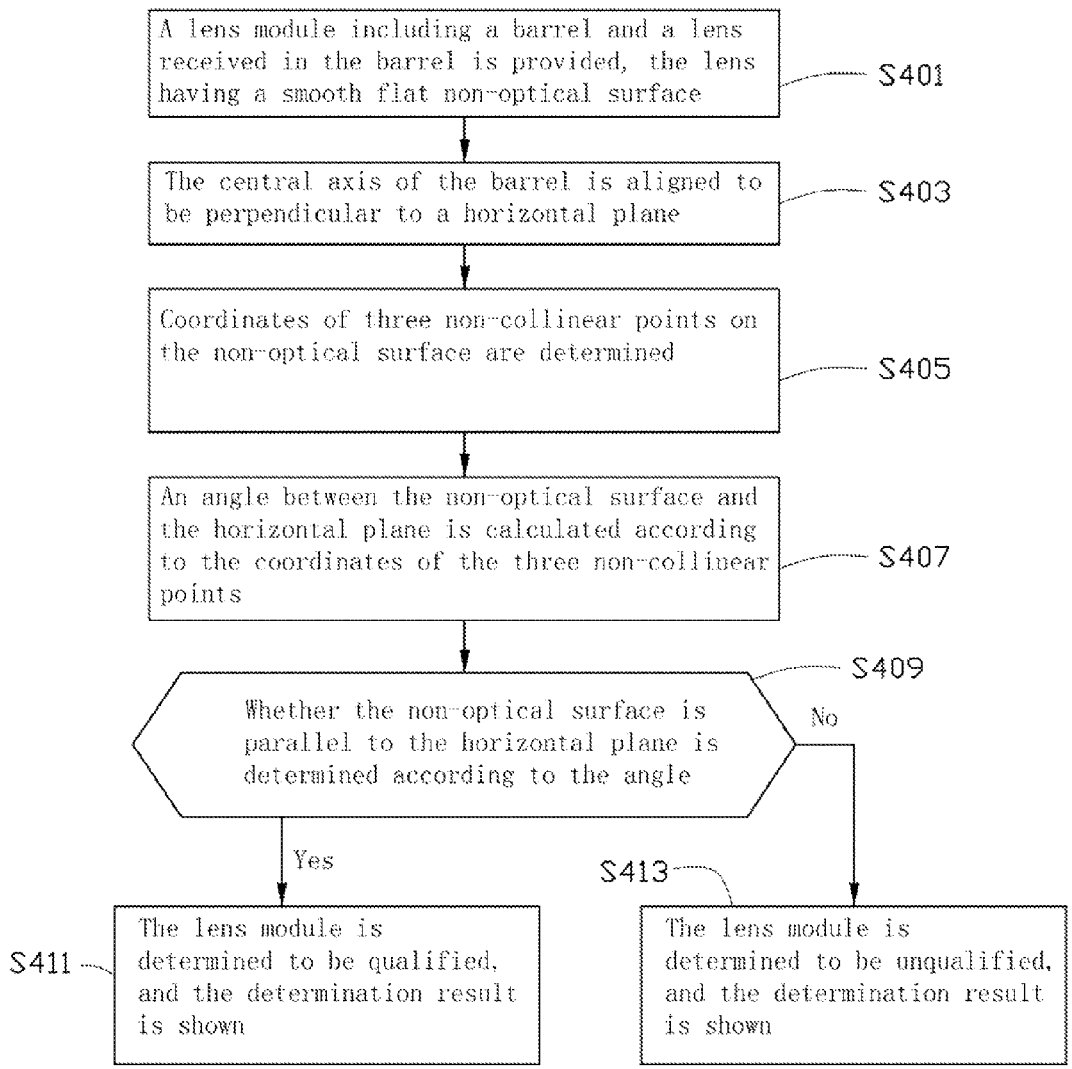
FIG. 5 is a flow chart of a method for testing a lens module according to one embodiment.

Referring to FIG. 5, one embodiment of a method for testing the lens module 10 is as follows.

In step S401, the lens module 10 is provided. The lens module 10 includes the barrel 11 and the lens 13 received in the barrel 11. The lens 13 includes the non-optical surface 133. The non-optical surface 133 is flat and smooth.

In step S403, the central axis of the barrel 11 is aligned to being perpendicular to a horizontal plane.

In step S405, coordinates of three non-collinear points O1, O2, O3 on the non-optical surface 133 are determined by the position detection device 30.

In step S407, the angle between the non-optical surface 133 and the horizontal plane is calculated according to the coordinates of the three non-collinear points O1, O2, O3.

In step S409, whether the non-optical surface 133 is parallel to the horizontal plane is determined according to the calculated angle. If the non-optical surface 133 is parallel to the horizontal plane, goes to step S411, otherwise goes to step S413.

In step S411, the lens module 10 is determined to be qualified, and the determination result is shown on the display panel 491.

In step S413, the lens module 10 is determined to be unqualified, and the determination result is shown on the display panel 491.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A system for testing a lens module, the lens module comprising a barrel and a lens received in the barrel, the barrel comprising a side surface which is parallel to the central axis of the barrel, the lens comprising a smooth and flat non-optical surface, the system comprising:
   an alignment device comprising a leveling unit and an alignment block supported by the leveling unit, wherein the alignment block comprises an alignment surface configured for being in contact with and parallel to the side surface of the barrel, and the leveling unit is configured for adjusting the alignment surface of the alignment block to be perpendicular to a horizontal plane such that the side surface of the barrel is perpendicular to the horizontal plane;
   a position detection device configured for determining the three dimensional coordinates of three non-collinear points on the non-optical surface; and
   a processing device configured for determining whether the non-optical surface is parallel to the horizontal plane according to the coordinates of the three non-collinear points, wherein the processing device comprises a calculating module for calculating an angle $\theta$ between the non-optical surface and the horizontal plane according to the following formula:

$$\theta = \arccos\left(\frac{\left|\begin{matrix} 1 & 1 & 1 \\ (x2-x1) & (y2-y1) & (z2-z1) \\ (x3-x1) & (y3-y1) & (z3-z1) \end{matrix}\right|}{\left|\begin{matrix} (x2-x1) & (y2-y1) \\ (x3-x1) & (y3-y1) \end{matrix}\right|}\right),$$

wherein (x1, y1, z1), (x2, y2, z2), and (x3, y3, z3) are respectively coordinates of the three non-collinear points on the non-optical surface.

2. The system of claim 1, wherein the leveling unit defines a receiving space for receiving the alignment block and the lens module.

3. The system of claim 1, wherein the alignment block defines a V-shaped groove and the alignment surface is a side surface of the V-shaped groove.

4. The system of claim 1, further comprising a frame, wherein the frame comprises a horizontal support and a L-shaped arm mounted on the horizontal support, the horizontal support supports the leveling unit, and the L-shaped arm supports the position detection device.

5. The system of claim 1, wherein the processing device further comprises a determining module, wherein an acceptable angle range is preset in the determining module, if the angle $\theta$ is in the acceptable angle range, the determining module determines that the non-optical surface is parallel to the horizontal plane, otherwise the determining module determines that the non-optical surface is unparallel to the horizontal plane.

6. The system of claim 5, wherein the processing device further comprises a display module for showing the determining result from the determining module.

7. A method for testing a lens module, the lens module comprising a barrel and a lens received in the barrel, the barrel comprising a side surface which is parallel to the central axis of the barrel, the lens comprising a smooth and flat non-optical surface, the method comprising:
   aligning the central axis of the barrel to be perpendicular to a horizontal plane;
   obtaining the three dimensional coordinates of three non-collinear points on the non-optical surface;
   calculating the angle between the non-optical surface and the horizontal plane according to the coordinates of the three non-collinear points, wherein the angle between the non-optical surface and the horizontal plane is calculated according to the following formula:

$$\theta = \arccos\left(\frac{\left|\begin{matrix} 1 & 1 & 1 \\ (x2-x1) & (y2-y1) & (z2-z1) \\ (x3-x1) & (y3-y1) & (z3-z1) \end{matrix}\right|}{\left|\begin{matrix} (x2-x1) & (y2-y1) \\ (x3-x1) & (y3-y1) \end{matrix}\right|}\right),$$

wherein $\theta$ is the angle between the non-optical surface and the horizontal plane, (x1, y1, z1), (x2, y2, z2), and (x3, y3, z3) are respectively coordinates of the three non-collinear points on the non-optical surface;
   determining whether the non-optical surface is parallel to the horizontal plane according to the angle; and
   determining that the non-optical surface is parallel to the horizontal plane and the lens module is qualified if the angle falls within an acceptable angle range.

8. The method of claim 7, further comprising:
   displaying the determined result of whether the lens module is qualified.

9. The method of claim 7, wherein the acceptable angle range is from 0 to 5 degrees.

10. The method of claim 7, wherein the acceptable angle range is from 175 to 180 degrees.

* * * * *